United States Patent [19]

Akashi et al.

[11] 3,998,097
[45] Dec. 21, 1976

[54] FLOW-MEASURING DEVICE

[75] Inventors: Koichiro Akashi; Hikaru Higuchi, both of Nagasaki; Takatomo Yamanaka, Yokohama, all of Japan

[73] Assignee: Mitsubishi Jukogyo Kabushiki Kaisha, Japan

[22] Filed: Mar. 17, 1975

[21] Appl. No.: 558,858

[52] U.S. Cl. .................................................. 73/211
[51] Int. Cl.$^2$ ............................................. G01F 1/36
[58] Field of Search ...................... 73/211; 138/44

[56] References Cited
UNITED STATES PATENTS

| | | | |
|---|---|---|---|
| 1,098,247 | 5/1914 | Gibbs | 73/211 |
| 2,127,501 | 8/1938 | Dall | 73/211 |
| 2,803,962 | 8/1957 | West | 73/211 |

FOREIGN PATENTS OR APPLICATIONS

| | | | |
|---|---|---|---|
| 22,183 | 1910 | United Kingdom | 138/44 |

*Primary Examiner*—Richard C. Queisser
*Assistant Examiner*—John P. Beauchamp
*Attorney, Agent, or Firm*—McGlew and Tuttle

[57] ABSTRACT

The flow-measuring device includes a restricting mechanism for throttling a fluid flow through a completely filled duct of rectangular cross section, whereby the flow rate is obtained from the differential pressure created by the pressures tapped from the duct sections upstream and downstream from the restriction. The restricting mechanism consists of a pair of flat orifice plates installed on the opposite inner walls of the duct and directed inwardly toward each other, with the inner edges of the plates being rectilinear and parallel to each other, equidistant from the opposite inner walls of the duct and within planes transverse to the direction of flow in the duct. The orifice plates are symmetrical to a plane extending along the centerline of the duct parallel to the inner walls.

6 Claims, 26 Drawing Figures

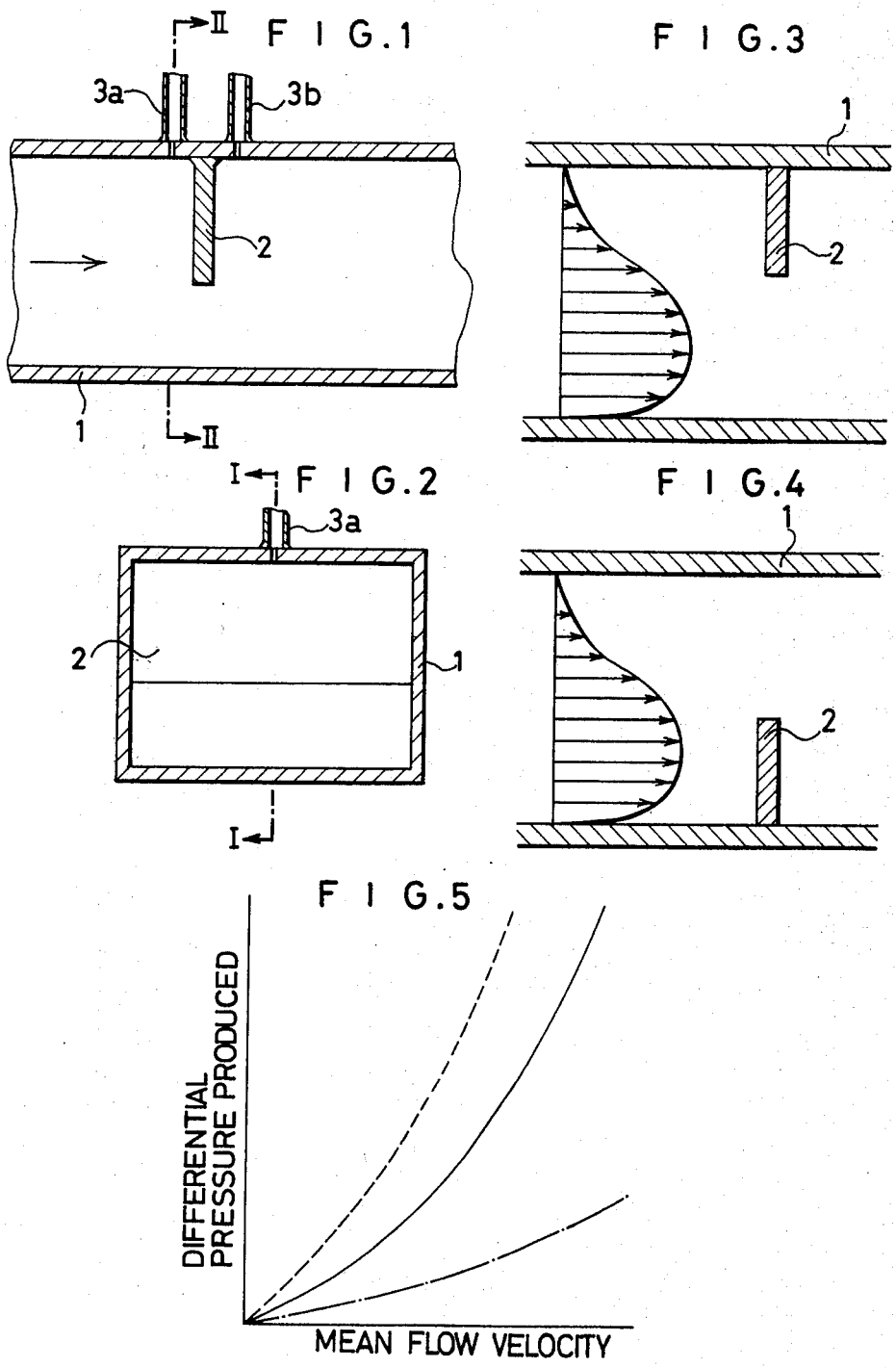

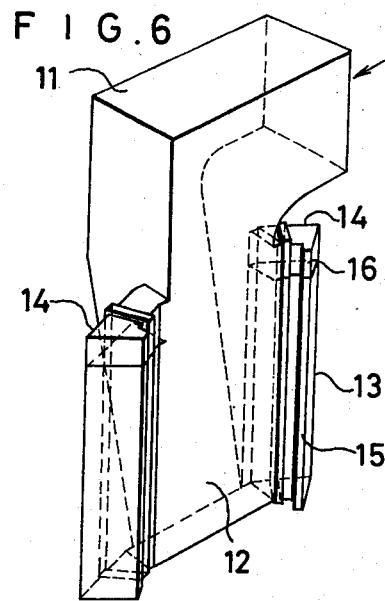
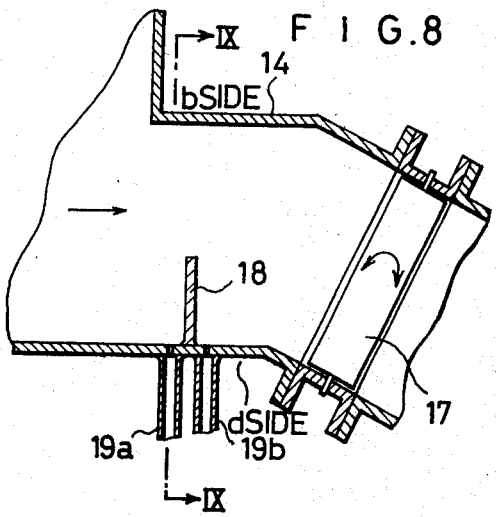
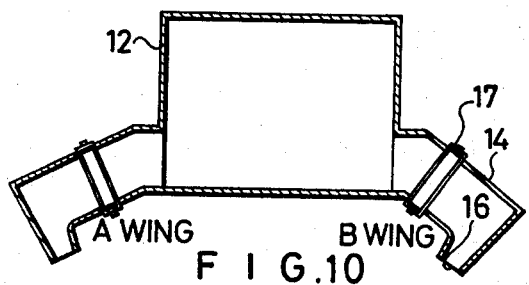
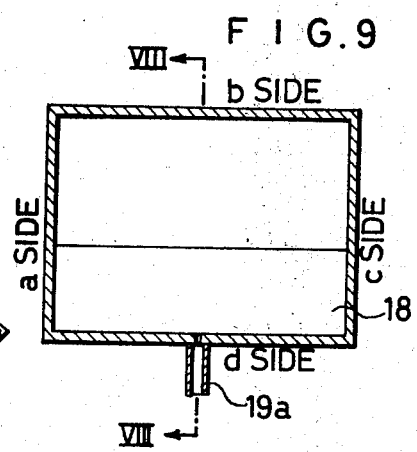
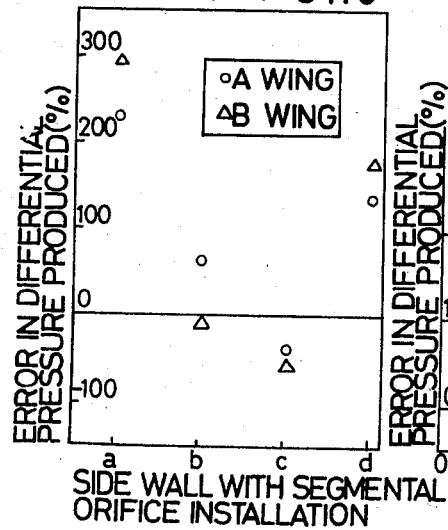

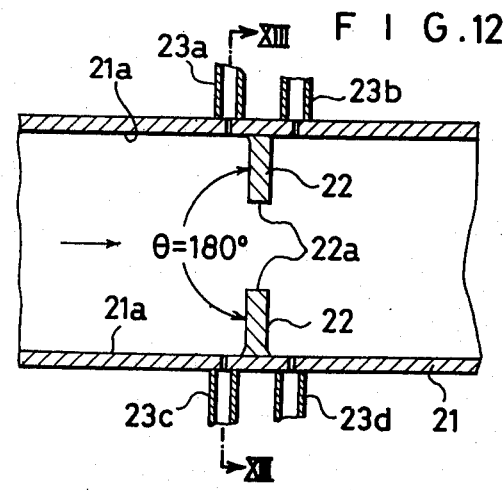
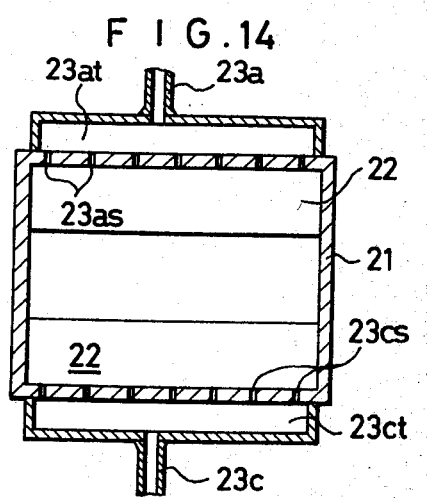
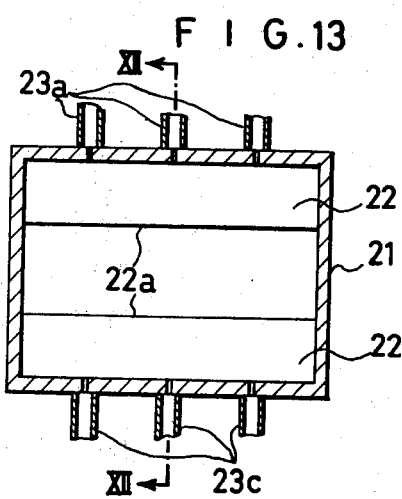
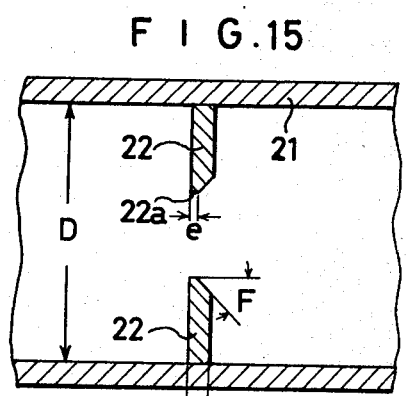
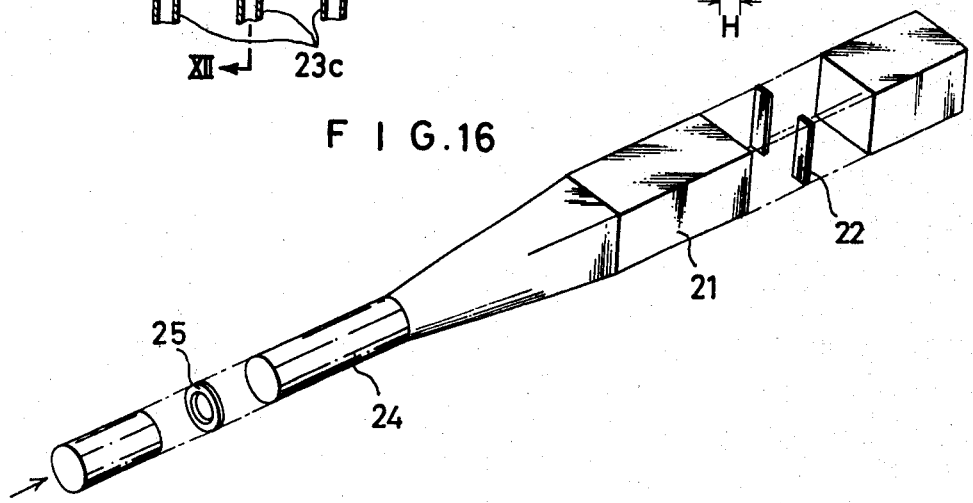

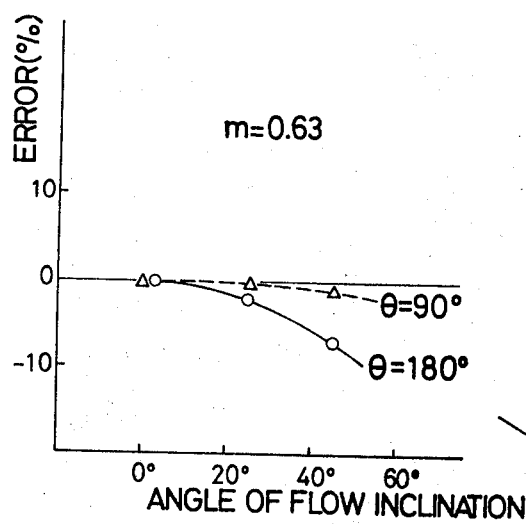
FIG. 21
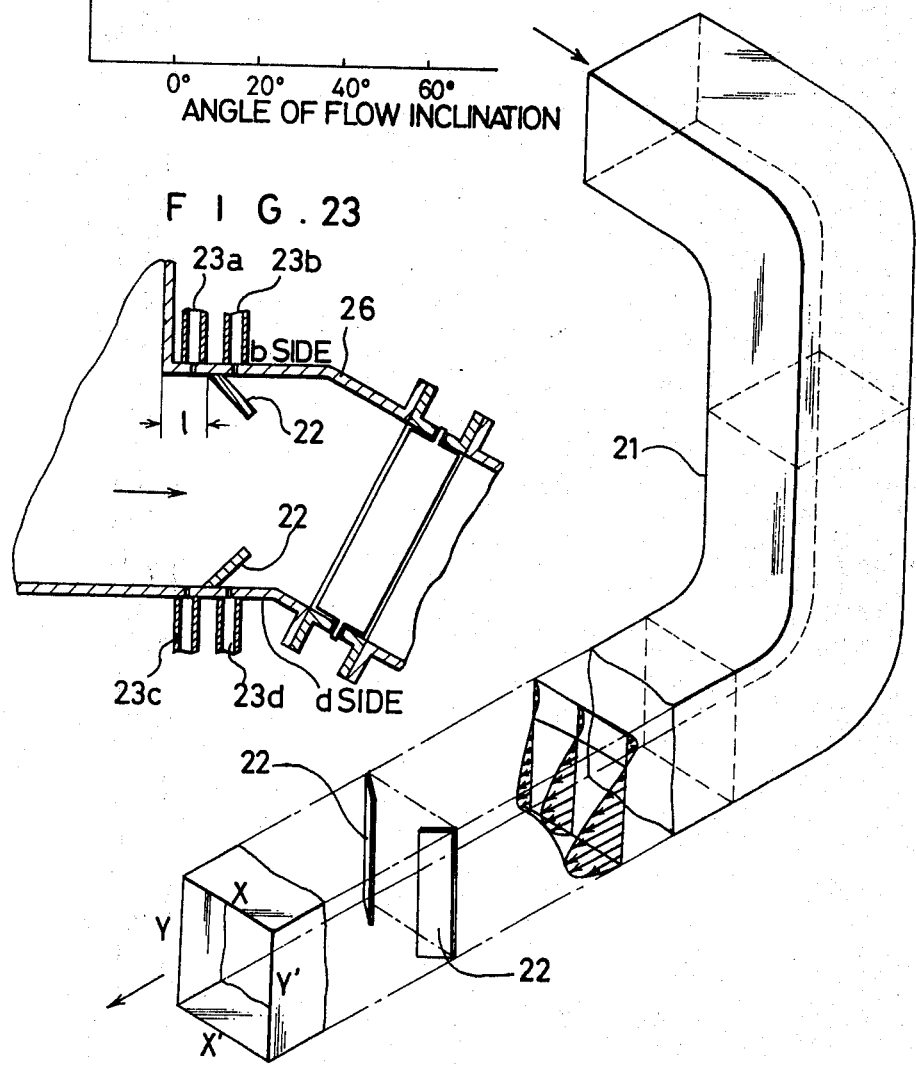
FIG. 22
FIG. 23

FLOW-MEASURING DEVICE

FIELD AND BACKGROUND OF THE INVENTION

This invention relates to a flow-measuring device, and more specifically to a device for measuring the rate of fluid flow through a completely filled duct of rectangular cross section.

Prior art devices of the type are as shown, for example, in FIGS. 1 and 2. The reference numeral 1 is a duct having a rectangular cross section, 2 is a segmental orifice plate as the primary measuring element, and 3a, 3b, are pressure taps formed in the wall of the duct portions upstream and downstream, respectively, from the orifice plate. As is well known in the art, the segmental orifice plate 2 is secured to inner walls of the duct 1, normal to the streamlines therein, so that the differential pressure created by the flow through the orifice and obtained from the taps 3a, 3b is determined for the measurement of the fluid flow rate by calculation with a known flow coefficient.

Where the straight duct section upstream of the primary element is not sufficiently long, the measuring device having such conventional orifice plates may present the following disadvantages:

a. With an ordinary segmental orifice the flow stream in the duct is deflected toward one side of the channel cross section where the orifice or orifice plate is provided. This will lead to an error in the resulting differential pressure should there remain any adverse effect of non-uniform flow due to the upstream configuration of the duct.

FIG. 3 shows streamlines being deflected toward the orifice or the opening left by the segmental orifice plate 2. Here the main stream directly passes through the orifice, and therefore the differential pressure produced by the orifice plate tends to become lower than that obtained from the flow of uniform velocity distribution.

In FIG. 4 the streamlines are deflected toward the opposite side or against the orifice plate. Because the main stream is baffled and throttled by the plate into the orifice, the resulting differential pressure will often be higher than that obtained with uniform velocity distribution.

Experimental data demonstrating the foregoing tendencies are plotted in FIG. 5. Of the curves representing the relations between the differential pressure produced and the mean flow velocity, the full line indicates the data obtained with uniform velocity distribution, the chain line the data in the case of FIG. 3, and the broken line the data in the case of FIG. 4.

b. Since the segmental orifice plate 2 is installed one-sidely, the downstream flow is deflected accordingly. If the channel has a damper or bend a short distance behind the orifice, the damper effect may decrease or the pressure loss at the bend may increase. Other possible troubles include intensified deflection flow downstream.

The disadvantage (a) of the conventional segmental orifice plate 2 will now be more fully discussed in connection with an actual arrangement wherein the orifice plates are installed within the flow channels of a boiler wind box assembly.

In the wind box assembly, as partly shown in perspective in FIG. 6, air for combustion enters from the upper right and passes through a bend 11 to a wind box entrance duct 12.

Separate wind boxes for air supply to burners are indicated at 13. The air for the burners is fed from inlets 15 through the burners into the boiler furnace.

The numeral 14 designates other wind boxes for overfire air supply. Air is forced through inlets 16 into the furnace to serve as over-fire air.

FIG. 7 is a transverse section through the wind box entrance duct 12, wind boxes 14, and inlets 16. Dampers for controlling the over-fire air supply are indicated at 17.

By way of example, the use of segmental orifice plates as the primary flow-measuring means for the automatic control of the flow rate of over-fire air will be described hereunder.

Because of the burner arrangement in the boiler, the ductwork for over-fire air supply consists of two duct systems, on the left and right sides in the form of wings A and B as in FIG. 7. The two systems are asymmetrical not only to each other, as can be seen from FIG. 7, but also to the wind box bend 11, as shown in FIG. 6. Thus, it will be readily appreciated that, if primary measuring elements are separately installed in the two systems, the different upstream configurations of the ducts will cause the elements to make dissimilar or unrelated errors.

With a wind box assembly of the construction described, it is a primary consideration to achieve equal measurement accuracy at the wings A and B, as with other wind box constructions. A matter of secondary consideration is to help the dampers function as efficiently as possible. Thirdly, the pressure loss relative to the differential pressure produced must be minimized.

Next, the segmental orifice plate installation will be described. FIG. 8 is an enlarged vertical section of the wing B duct of FIG. 7. FIG. 9 is a section through the line IX—IX of FIG. 8. Both figures illustrate a conventional segmental orifice plate 18 installed inside the duct, on the side d.

On condition that the same ratio of the orifice cross sectional area to the channel cross sectional area ($m = 0.6$) be maintained, the corresponding segmental orifice plate was attached to the side $a$, $c$, or $d$ instead of on the side $b$, and each time the error was determined. Pressure taps 19a, 19b were formed in tandem along the center of each side, upstream and downstream of the orifice plate, and the respective pressures were taken out to obtain the differential pressure.

FIG. 10 is a graphical representation of the errors observed in the wings A and B with different segmental orifice plate locations. The errors on the ordinate are those in the differential pressures thus produced, given in percent on the basis of the differential pressures (normal, reference values) obtained from duct sides having adequate straight sections upstream, the reference values being 100.

It will be seen from these data that the errors in differential pressures produced vary, and largely, with the orifice plate locations, and that there are material discrepancies between the errors in the wings A and B.

FIG. 11 is a graph showing the relationship between the differential pressure produced by the segmental orifice plate secured to the side $d$ and the flow velocity of the fluid. It indicates that the error in differential pressure depends also upon the Reynolds' number $Re$ (flow velocity) in the closed channel.

From the foregoing discussion it is clear that the use of existing segmental orifice plates as primary means for measuring the flow rate in boiler wind boxes is not desirable for the purpose of automatic control of the flow of over-fire air for the boiler.

SUMMARY OF THE INVENTION

The present invention is directed to the solution of the foregoing problems that have hitherto been associated with the measurement of fluid flow through rectangular channels, particularly those having a bend therein, and therefore the object of the invention is to provide a flow-measuring device comprising a pair of flat, substantially planar orifice plates fixed mounted symmetrically on opposite inner side walls of a completely filled duct, downstream of a bend in the case of a duct or channel having a bend therein, instead of a single plate attached to one side only as in a conventional arrangement, the plates extending inwardly toward each other with their inner edges being rectilinear and in spaced parallel relation to each other, equidistant from the respective opposite inner walls of the duct, and within planes transverse to the direction of flow of fluid in the duct, the orifice plates being symmetrical to a plane extending along the center line of the duct and parallel to the respective opposite inner walls thereof, so that the objectionable deflection of the downstream flow is corrected, the pressure loss is minimized, an increased differential pressure is produced, and the measuring accuracy is improved without being adversely affected by any non-uniform upstream flow.

The device, in accordance with the invention, includes a restricting mechanism for throttling a fluid flow through a completely filled duct of a rectangular cross section, particularly a duct having a bend therein, whereby the flow rate is obtained from the differential pressure created by the pressures tapped from the duct sections upstream and downstream of the restriction, characterized in that the restricting mechanism consists of a pair of flat substantially planar orifice plates installed on the opposite inner side walls of the duct downwardly of a bend in a duct having a bend therein, and directed inwardly toward each other, with the inner edges of the plates being rectilinear and parallel to each other, equidistant from the opposite inner walls of the duct and within planes transverse to the direction of flow in the duct, the orifice plates being symmetrical to a plane extending along the centerline of the duct in parallel to the inner walls the plane being that of the bend in the case of a duct having a bend therein.

The above and other objects, advantages, and features of the invention will become more apparent from the following detailed description taken in conjunction with the accompanying drawings showing embodiments thereof. It is to be understood, however, that the embodiments shown are for the illustrative purpose only and are in no sense limitative.

BRIEF DESCRIPTION OF THE DRAWINGS

In the drawings:

FIG. 1 shows, in vertical section, a conventional flow-measuring device, taken on the line I—I of FIG. 2;

FIG. 2 is a cross sectional view taken on the line II—II of FIG. 1;

FIGS. 3 and 4 are sectional views illustrating deflection flows in ducts with the primary element of the conventional device in different locations;

FIG. 5 is a graph representing the results of experiments with the ordinary conventional device;

FIG. 6 is a fragmentary perspective view of a boiler wind box assembly;

FIG. 7 is a transverse sectional view of the wind box assembly;

FIG. 8 is an enlarged vertical view of the duct in the wing B of the assembly shown in FIG. 7, taken on the line VIII—VIII of FIG. 9;

FIG. 9 is a sectional view taken on the line IX—IX of FIG. 8;

FIG. 10 is a graph giving the results of experiments conducted to obtain the errors in differential pressure produced by installing the segmental orifice plate on the inner side wall $a$, $b$, $c$, or $d$ of each duct in the conventional arrangement shown in FIGS. 6 to 9;

FIG. 11 is a graph showing the relationship between the differential pressure and the Reynolds' number in each duct where the segmental orifice plate is held on the side wall $d$ in the arrangement of FIGS. 6 to 9;

FIG. 12 is a vertical sectional view of a flow-measuring device embodying the present invention, taken on the line XII—XII of FIG. 13;

FIG. 13 is a cross sectional view of the first embodiment taken on the line XIII—XIII of FIG. 12;

FIGS. 14 and 15 show, in section, modifications of the first embodiment;

FIG. 16 is a perspective view of a model arrangement for testing, incorporating the first embodiment of the invention;

FIG. 21 is a graph in which experimental data on the embodiment of the invention are plotted;

FIG. 22 is a perspective view of a model arrangement incorporating the second embodiment of the invention;

FIG. 23 is a sectional view similar to FIG. 8 but illustrating an arrangement using the second embodiment;

DESCRIPTION OF THE PREFERRED EMBODIMENTS

Figure 17:
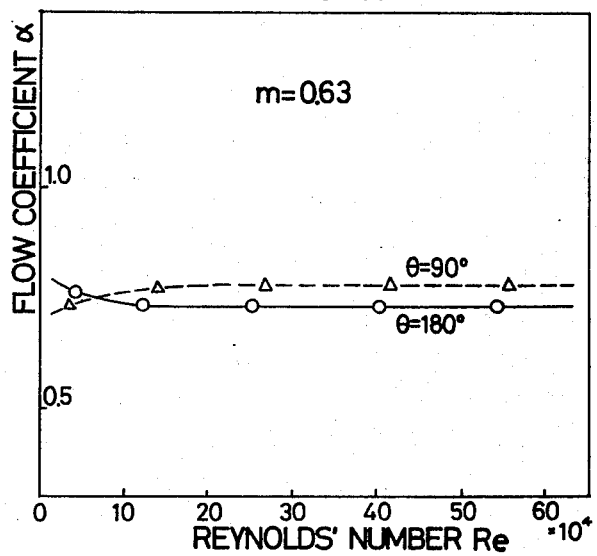
FIG. 17 is a graph showing the results of experiments with this embodiment of the invention.

Referring now to FIGS. 12 and 13, there is shown a restricting mechanism according to the invention as comprising a pair of flat orifice plates 22 held on opposite inner walls of the duct 21 and directed inwardly toward each other as restrictive means for throttling the flow of the fluid passing fully through a duct 21 of a rectangular cross section. The inner edges 22a of the orifice plates facing each other are rectilinear and arranged in parallel to each other.

The inner edges 22a are at equal distances from the inner walls 21a on which the respective orifice plates are installed, and are within planes normal to the flow direction of the fluid in the duct. Thus, the two orifice plates 22 are symmetrically located relative to a plane extending along the duct centerline and parallel to the inner walls 21a of the duct.

It is to be noted that, in this first embodiment of the invention, the angle θ the two orifice plates 22 make with each other is 180° and the plates are secured to the inner wall surfaces 21a in the usual manner, as by welding.

The differential pressure produced by the restriction in the fluid flow through the duct is obtained from the pressures taken out through pressure taps 23a, 23b, 23c, 23d formed in the wall portions of the duct upstream and downstream of the orifice plates.

While the pressure taps 23a through 23d are shown in locations equidistant from the orifice plates 22, the distance may be varied where necessary. Also it is possible to replace the plurality of pressure taps in both of the opposite walls, e.g., the taps 23a and 23c in rows of three each in the arrangement shown in FIG. 13, by taps 23a, 23c, in both walls of the duct as in FIG. 14, which collect pressures from a number of tiny holes 23as, 23cs in the walls, via common chambers 23at, 23ct.

In applications where the orifice plates 22 are thicker than a minimum, the inner edges 22a of the plates are beveled, as shown in FIG. 15, at an angle to the downstream faces of the plates. In this case, the following relation holds between the thickness e of the inner edge of each plate and the height or the dimension D of the channel:

$$0.005D \leq e \leq 0.02D$$

The angle of relief F is then $$30° \leq F \leq 45°$$

Where the thickness H of the orifice plates is equal to or less than e, the plates need no beveling.

With the arrangement of the construction described, either the differential pressure between the mean upstream pressure from the taps 23a, 23c and the mean downstream pressure from the taps 23b, 23d, or the mean value of the differential pressure between the pressures from the taps 23a, 23b and the differential pressure between the pressures from the taps 23c, 23d, is obtained. Then, in the same manner as with the conventional circular orifice plates having concentric orifices, the flow rate is found from the value thus obtained with the aid of a predetermined flow coefficient.

If ΔP denotes the mean differential pressure, m the orifice-to-channel cross-sectional-area ratio, γ the fluid density, g the acceleration of gravity, α the flow coefficient, and Q the flow rate, then the rate Q is given by the equation $$Q = \alpha m \sqrt{\frac{2g}{\gamma} \cdot \Delta P}$$

where the flow coefficient α is calibrated in advance.

Experiments performed to ascertain the reliability of the orifice installation in accordance with the invention will now be explained.

They were intended to demonstrate the fact that the same flow rate equation holds and the flow coefficient remains constant in the application where two orifice plates are held apart on the opposite inner walls of a duct having a rectangular cross section, as is the case with the circular orifice plate having a concentric orifice.

As shown in FIG. 16, a duct 21 of rectangular cross section and a duct 24 of circular cross section, both constituting sufficiently long straight channels, were directly connected together. They were equipped, respectively, with orifice plates 22 according to the present invention and an ordinary concentric-orifice plate 25. With this model arrangement, the flow coefficient vs Reynolds' number characteristics were compared with the theoretical ones, and the pressure loss and inclined-flow characteristics were analyzed.

FIG. 17 summarizes the results. In the graph the full-line curve represents the flow coefficient vs Reynolds' number characteristics of the orifice shown in FIGS. 12 and 13.

As can be seen from the graph, the flow coefficient is constant at a Reynolds' number in the vicinity of 2 × 10⁵. This clearly indicates the reliability of the orifice installation according to the invention.

Figure 18:
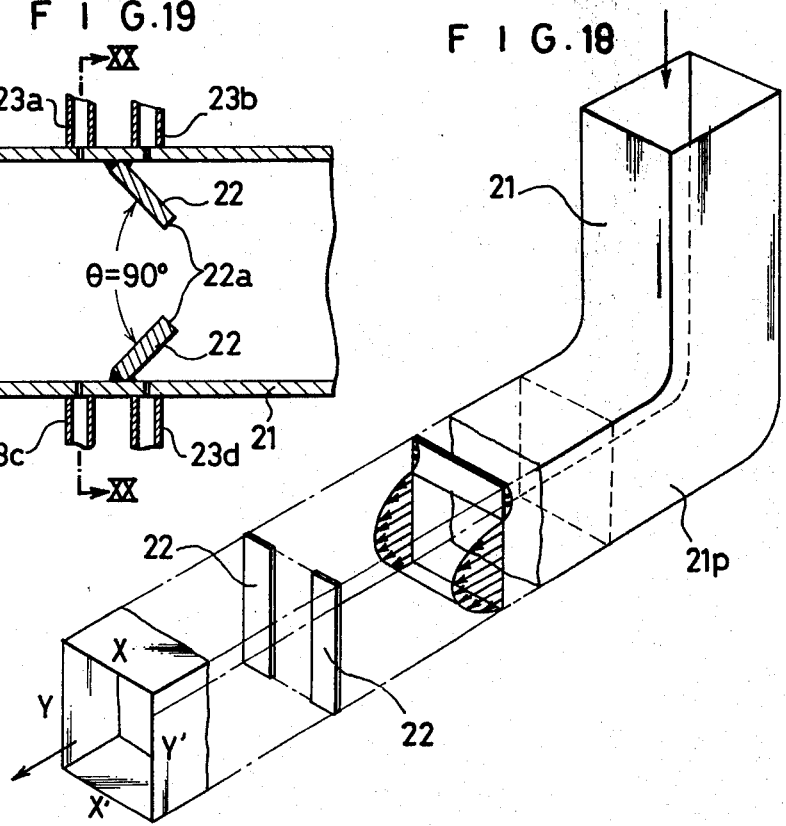
FIG. 18 is a perspective view of an arrangement in which the device in accordance with the invention is installed downstream of a single bend of the duct.

FIG. 18 shows a rectangular duct 21 in which orifice plates of the invention are installed, in a relation of θ = 180°, downstream of a single bend 21p. It will be seen that, in the absence of an appropriate restriction, a considerable imbalance of flow could occur in the X—X' direction. Even a counterflow region would in some cases be left on the side X. As already stated, if a segmental orifice plate is installed only on the side X or X', the differential pressure thereby created will lead to a serious error. If the plate is held only on the side Y or Y', the error will again be not permissible.

In the arrangement shown in FIG. 18, the orifice plates 22 extend inwardly from the sides of the duct 21 in a direction perpendicular to the plane of the bend 21p, with their rectilinear inner edges being parallel to each other and spaced equidistant from the plane including the bend 21p. Thus, the fluid flows through the orifice defined by the plates 22 while being largely unbalanced in the direction X—X' by the bend 21p. As the rectilinear inner edges of the orifice plates 22 extend parallel to the plane including the bend 21p, there is no appreciable difference between the respective pressure distributions on the two plates 22. This is in contrast to the effect produced if the orifice plates 22 were arranged with their rectilinear inner edges perpendicular to the plane including the bend 21p. While the pressure distribution longitudinally of the plates 22 may vary due to the unbalance of the fluid flow in the direction X—X', this can be readily compensated by providing a plurality of orifices 23 for detecting the pressures on opposite sides of the plates 22, so that the pressure differential is made uniform and any measurement errors, due to nonuniform flow, can be reduced to a minimum. In particular, the number of pressure taps has only to be increased to counteract any adverse conditions. It has been experimentally confirmed that the provision of the orifice defined by the plates 22, as in FIG. 18, corrects the imbalance and minimizes any measurement error.

Figure 20:
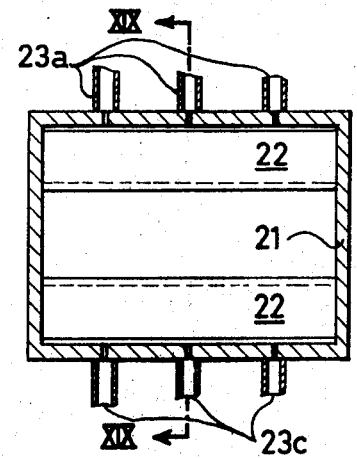
FIG. 20 is a cross sectional view taken on the line XX—XX of FIG. 19.
Figure 19:
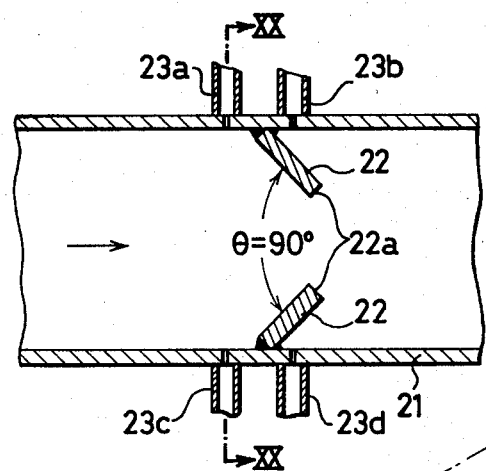
FIG. 19 is a vertical sectional view of another flow-measuring device embodying the invention, taken on the line XIX—XIX of FIG. 20.

FIGS. 19 and 20 show a flow-measuring device as the second embodiment of the invention. In this embodiment the angle η the pair of orifice plates 22 make is less than 180° and is set to 90°.

Therefore, the inner edges 22a of the orifice plates need not be beveled on the downstream faces.

An advantage derivable from this arrangement is that sharp orifice edges are obtained by merely cutting the base ends of the plates at an angle of 90° as shown.

Where $\theta > 90°$, the inner edges of the plates must be beveled accordingly as when $\theta = 180°$ shown in FIG. 15.

Exactly in the same way as with the first embodiment, either the differential pressure between the mean value of the upstream pressures taken out of the taps 23a, 23c and the mean value of the downstream pressures from the taps 23b, 23d, or the mean value of the differential pressures between the pressures from the taps 23a, 23b and those from the taps 23c, 23d, is obtained. Then, with the use of a known flow coefficient, the fluid flow rate is determined.

The flow coefficient vs Reynolds' number characteristics of the orifice installation shown in FIGS. 19 and 20 are represented by a broken-line curve in FIG. 17.

It will be appreciated that, in the same manner as when $\theta = 180°$, the flow coefficient is constant at a Reynolds' number of over $2 \times 10^5$ and is intimately close to the theoretical values. The results tell the reliability of the orifice according to the invention.

FIG. 21 is a graph giving the experimental data on errors made with ducts wherein the flow immediately before the orifice is inclined through an angle or is normal without inclination.

It is manifest from the graph that the orifice installation with $\theta < 180°$ is superior when the upstream flow is markedly deflected.

FIG. 22 schematically illustrates a duct 21 of rectangular cross section, with orifice plates 22 of the $\theta < 180°$ type according to the invention installed downstream from a tridimensional double bend, with the rectilinear edges of the plates 22 again extending parallel to the plane including the bend nearer to the orifice plates 22. The same conditions as mentioned above for the embodiment of FIG. 18 apply here also. Here the imbalance of flow is notable in the X—X' direction under the influence of the bend closer to the orifice.

In addition, the influence of the bend is synthesized with that of the farther upstream bend, leaving some unbalanced flow in the Y—Y' direction, too.

It has been experimentally proved that, in such a case, the installation of the orifice plates 22 in the relation $\theta < 180°$ with the rectilinear inner edges of the orifice plates again extending in spaced parallel relation to the plane including the bend nearer the orifice plates, makes it possible to obtain a value close to the mean value of the upstream and downstream pressures by dint of the tilted orifice.

The orifice installation shown in FIG. 23 is such that, like the arrangement in FIG. 8, a pair of orifice plates 22 in the relation $\theta = 90°$ are installed a distance $l$ downstream from the inlet of an over-fire air duct 26 which constitutes the wing B duct in FIGS. 6 and 7.

In the same way as in FIG. 20, pressure taps 23a, 23b, 23c, and 23d are provided at the upstream and downstream sides of the orifice, in rows of three each in the side walls ($b$ and $d$) of the duct. The taps in each row are united by a common pressure-conducting pipe to equalize the pressures thereby tapped.

Figure 24:
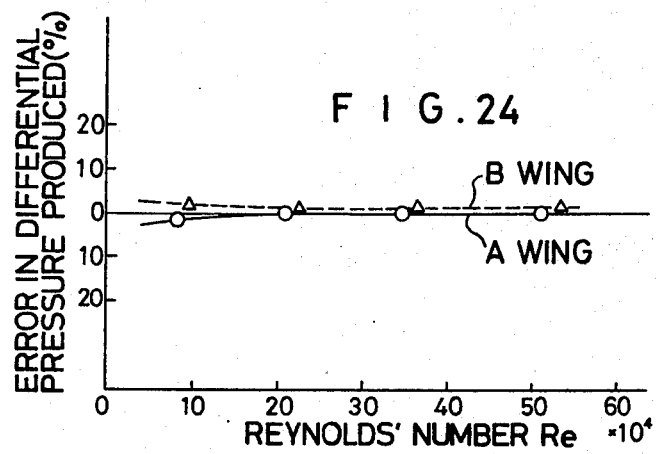
FIG. 24 is a graph showing the results of experiments with the arrangement of FIG. 23.

FIG. 24 is a graphical representation of the data obtained by experiments with the model arrangement of FIG. 23. It can be seen that the difference between the errors in the wings A and B is within about 2%, the errors in the individual wings being of the order of ±1%.

The term "errors" used in this case means just what has already been defined in connection with the arrangement of FIGS. 10 and 11. It has also been found that the errors are substantially constant when the duct is working at a given Reynolds' number or flow velocity. These experimental data conjointly attest to the effectiveness of the orifice according to the invention.

Figure 25:
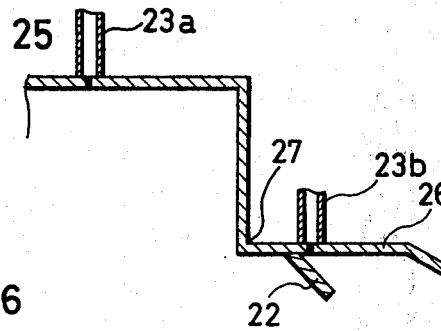
FIG. 25 is a fragmentary sectional view similar to FIG. 23 but showing the pressure taps in different locations.

FIG. 25 shows an over-fire air duct of a boiler similar to the one in FIG. 23, using the same orifice plates 22 of the $\theta = 90°$ type.

The only difference lies in the location of the upstream pressure taps. In the embodiment shown in FIG. 25, the pressure taps 23a are provided at points where they can extract the static pressure from the duct section upstream from the inlet 27 of the over-fire air duct 26 instead of from the duct section immediately before the orifice.

Figure 26:
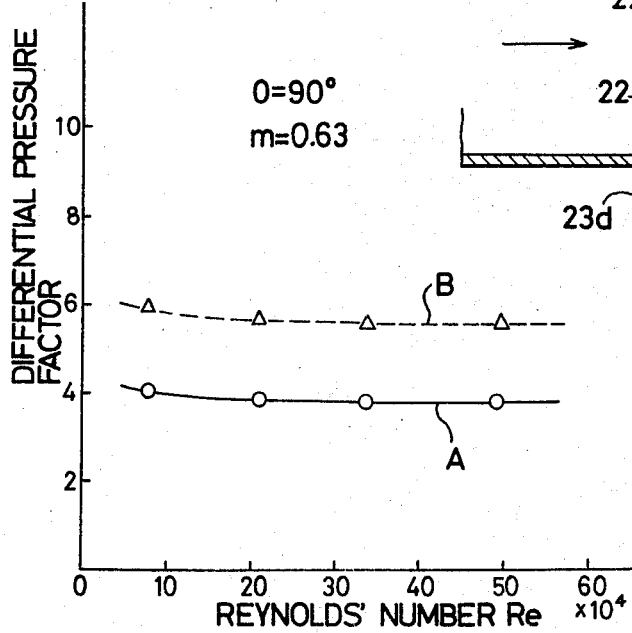
FIG. 26 is a graph showing the results of experiments with the arrangement of FIG. 25.

FIG. 26 is a graph showing the relationship between the mean flow velocity in the over-fire air duct of FIG. 25 and the differential pressure factor.

Here the term "differential pressure factor" is used to mean the ratio of the differential pressure produced by the orifice to the mean dynamic pressure in the duct, or an indication of the sensitivity of the differential pressure by the orifice.

The curves A and B in FIG. 26 represent the following:

Curve A: (in case of the embodiment shown in FIG. 23)

$$\text{Differential pressure factor} = \frac{\text{Pressure upstream from orifice} - \text{Pressure downstream from orifice}}{\text{Mean dynamic pressure}}$$

Curve B: (in case of the embodiment shown in FIG. 25)

$$\text{Differential pressure factor} = \frac{\text{Static pressure in duct section upstream from over-fire air duct inlet} - \text{Pressure downstream from orifice}}{\text{Mean dynamic pressure}}$$

The experimental results indicate that the factor in the embodiment B is always higher than that in A by substantially the same rate regardless of the flow velocity of the fluid.

This means that the pressure loss at the orifice against the same differential pressure produced is less in B than in A. It then demonstrates that the pressure tap means employed in FIG. 25 is more efficient than that in FIG. 23.

Important considerations governing the choice of the angle $\theta$ the two orifice plates are to make in conformity with the present invention, whether the plates should be held apart at $\theta = 180°$ or $\theta < 180°$, are as follows.

Were $\theta = 180°$, the orifice plates are attached and supported with ease, and the length of the orifice in the direction of flow within the duct can be shortened.

Therefore, this orifice arrangement is desirable in ducts wherein the non-uniformity of the upstream flow is not serious, or the upstream bend is a singular or two-dimensional double bend, or where the two bends are spaced an adequate distance apart.

The $\theta < 180°$ type is effective in applications where the upstream duct configuration is complicated and, moreover, the straight duct section is not sufficiently long.

The latter is preferred, for the reason stated, where the bend upstream from the orifice is a three-dimensional complex one or where there is little straight section between the bend and the orifice. Also, it will give good results when the pressure loss is to be reduced.

As has been described in detail, the flow-measuring device according to the invention is advantageous because the pair of orifice plates symmetrically installed in a duct of rectangular cross section function very effectively, rendering the measurement of the fluid flow rate possible with a high degree of accuracy even if there is a non-uniform flow upstream from the orifice.

What is claimed is:

1. A flow-measuring device, of the type in which the flow rate is derived from the pressure differential between pressures measured at the upstream and downstream sides of a flow restricting mechanism throttling the fluid flow through a completely filled duct, for measuring the flow rate at a point downstream of a bend in a completely filled duct of rectangular cross-section, where the speed distribution becomes non-uniform, across the duct, in a direction parallel to the plane in which the duct is bent, due to such bend, said flow-measuring device, comprising, in combination, a flow restricting mechanism positioned at said point in said duct downstream of said bend; and respective pressure measuring taps communicating with said duct on the upstream and downstream sides of said flow restricting mechanism; said flow restricting mechanism consisting of a pair of flat, substantially planar orifice plates fixedly mounted on respective opposite inner walls of said rectangular cross-section duct and extending inwardly toward each other, with the inner edges of said plates being rectilinear and in spaced parallel relation to each other, equidistant from said respective opposite inner walls of said duct, and within planes transverse to the direction of flow of fluid in said duct, the rectilinear inner edges of said orifice plates being parallel and symmetrical to the plane including said bend and extending along the center line of said duct.

2. A device according to claim 1 wherein the inner edges of the two orifice plates are beveled at a given angle to the downstream faces of the plates.

3. A device according to claim 1 wherein the two orifice plates extend at an angle $\theta$ of 180° to each other.

4. A device according to claim 1, wherein the two orifice plates extend at an angle $\theta$ of 90°–180° to each other.

5. A flow measuring device, of the type in which the flow rate is derived from the pressure differential between pressures measured at the upstream and downstream sides of a flow restricting mechanism throttling the fluid flow through a completely filled duct, for measuring the flow rate at a point downstream of a bend in a completely filled duct of rectangular cross-section, where the speed distribution becomes non-uniform, across the duct, in a direction parallel to the plane in which the duct is bent, due to such bend, said flow-measuring device, comprising, in combination, a flow restricting mechanism positioned at said point in said duct downstream of said bend; and respective pressure measuring taps communicating with said duct on the upstream and downstream sides of said flow restricting mechanism; said flow restricting mechanism consisting of a pair of flat, substantially planar orifice plates fixedly mounted on respective opposite inner walls of said rectangular cross-section duct and extending inwardly toward each other, with the inner edges of said plates being rectilinear and in spaced parallel relation to each other, equidistant from said respective opposite inner walls of said duct, and within planes transverse to the direction of flow of fluid in said duct, said orifice plates being symmetrical to a plane extending along the center line of said duct and parallel to said respective opposite inner walls; the two orifice plates extending at an angle $\theta$ of 90° to each other.

6. A flow-measuring device, of the type in which the flow rate is derived from the pressure differential between pressures measured at the upstream and downstream sides of a flow restricting mechanism throttling the fluid flow through a completely filled duct, for measuring the flow rate at a point downstream of a bend in a completely filled duct of rectangular cross-section, where the speed distribution becomes non-uniform, across the duct, in a direction parallel to the plane in which the duct is bent, due to such bend, said flow-measuring device, comprising, in combination, a flow restricting mechanism positioned at said point in said duct downstream of said bend; and respective pressure measuring taps communicating with said duct on the upstream and downstream sides of said flow restricting mechanism; said flow restricting mechanism consisting of a pair of flat, substantially planar orifice plates fixedly mounted on respective opposite inner walls of said rectangular cross-section duct and extending inwardly toward each other, with the inner edges of said plates being rectilinear and in spaced parallel relation to each other, equidistant from said respective opposite inner walls of said duct, and within planes transverse to the direction of flow of fluid in said duct, said orifice plates being symmetrical to a plane extending along the center line of said duct and parallel to said respective opposite inner walls; said respective opposite inner walls of said rectangular cross-section duct being parallel to the plane in which said duct is bent; said opposite inner walls having respective pressure taps on the upstream and downstream sides of said orifice plates.

* * * * *